March 12, 1957     A. F. L. ANDERSON     2,784,555
FLUID COUPLING
Filed Dec. 10, 1953     6 Sheets-Sheet 1
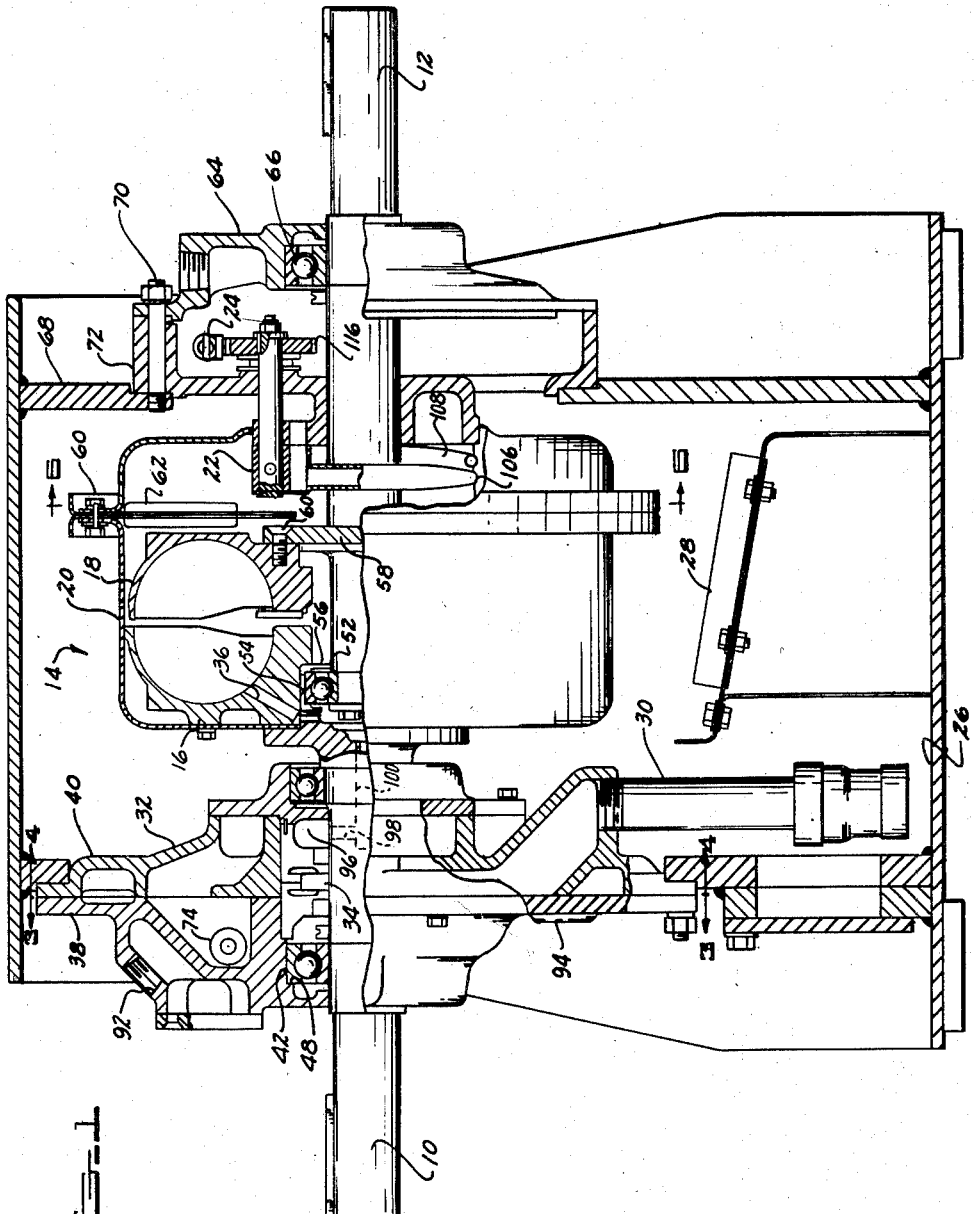
INVENTOR.
AXEL F. L. ANDERSON
BY
ATTORNEYS March 12, 1957  A. F. L. ANDERSON  2,784,555
FLUID COUPLING
Filed Dec. 10, 1953 6 Sheets-Sheet 2
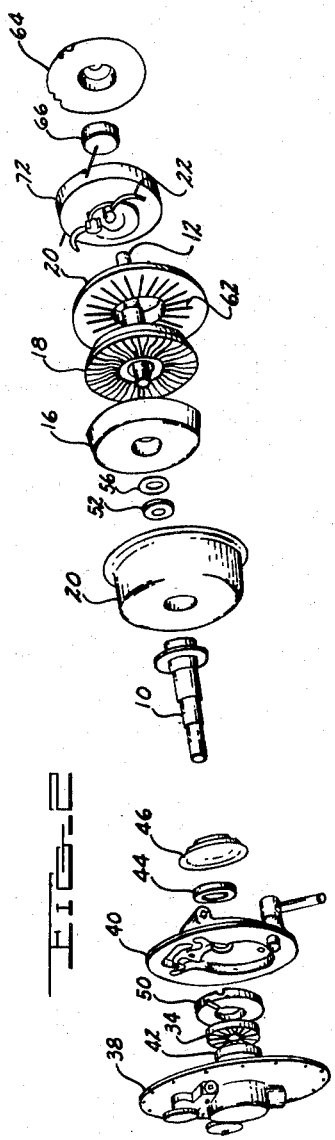
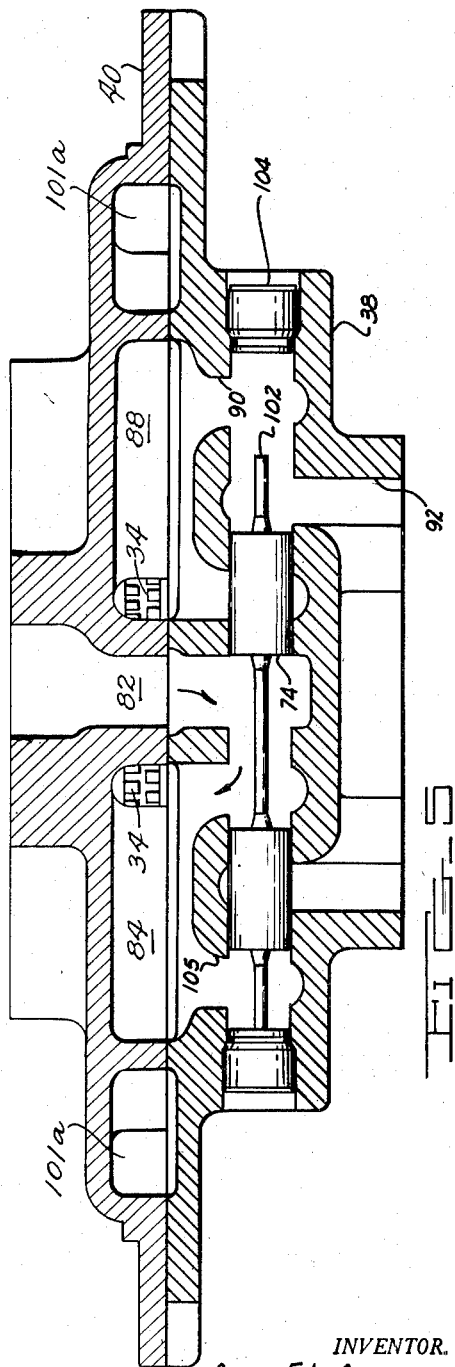
INVENTOR.
AXEL F. L. ANDERSON
BY
ATTORNEYS

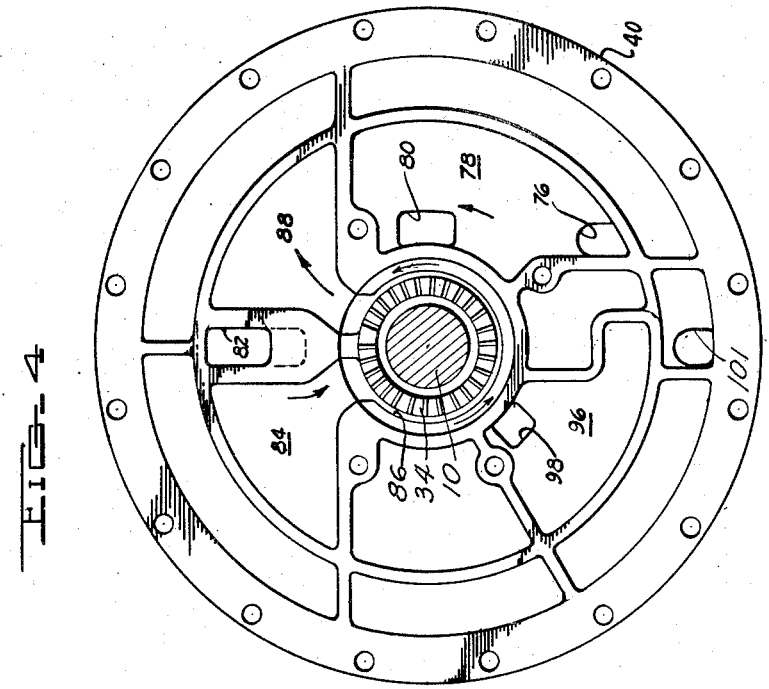
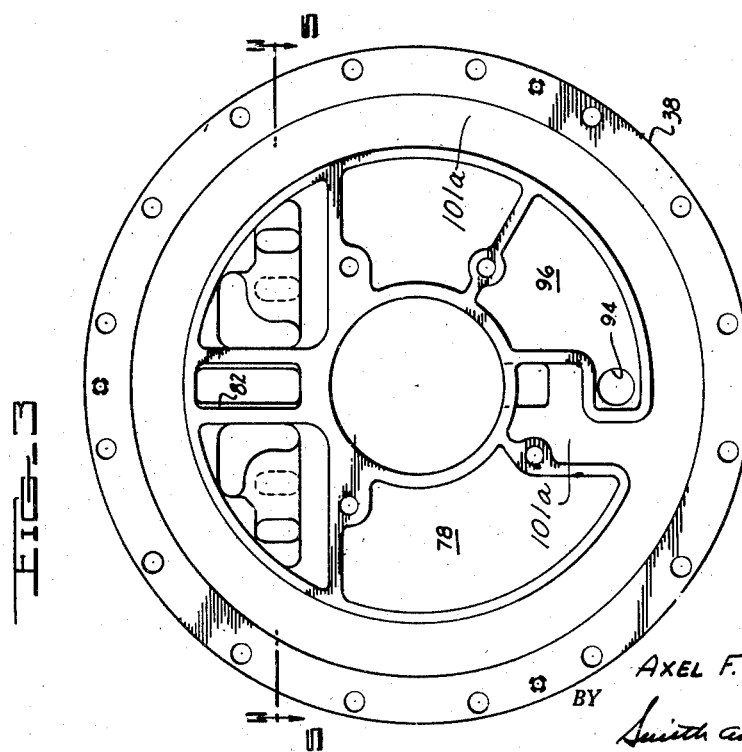

March 12, 1957 A. F. L. ANDERSON 2,784,555
FLUID COUPLING
Filed Dec. 10, 1953 6 Sheets-Sheet 4
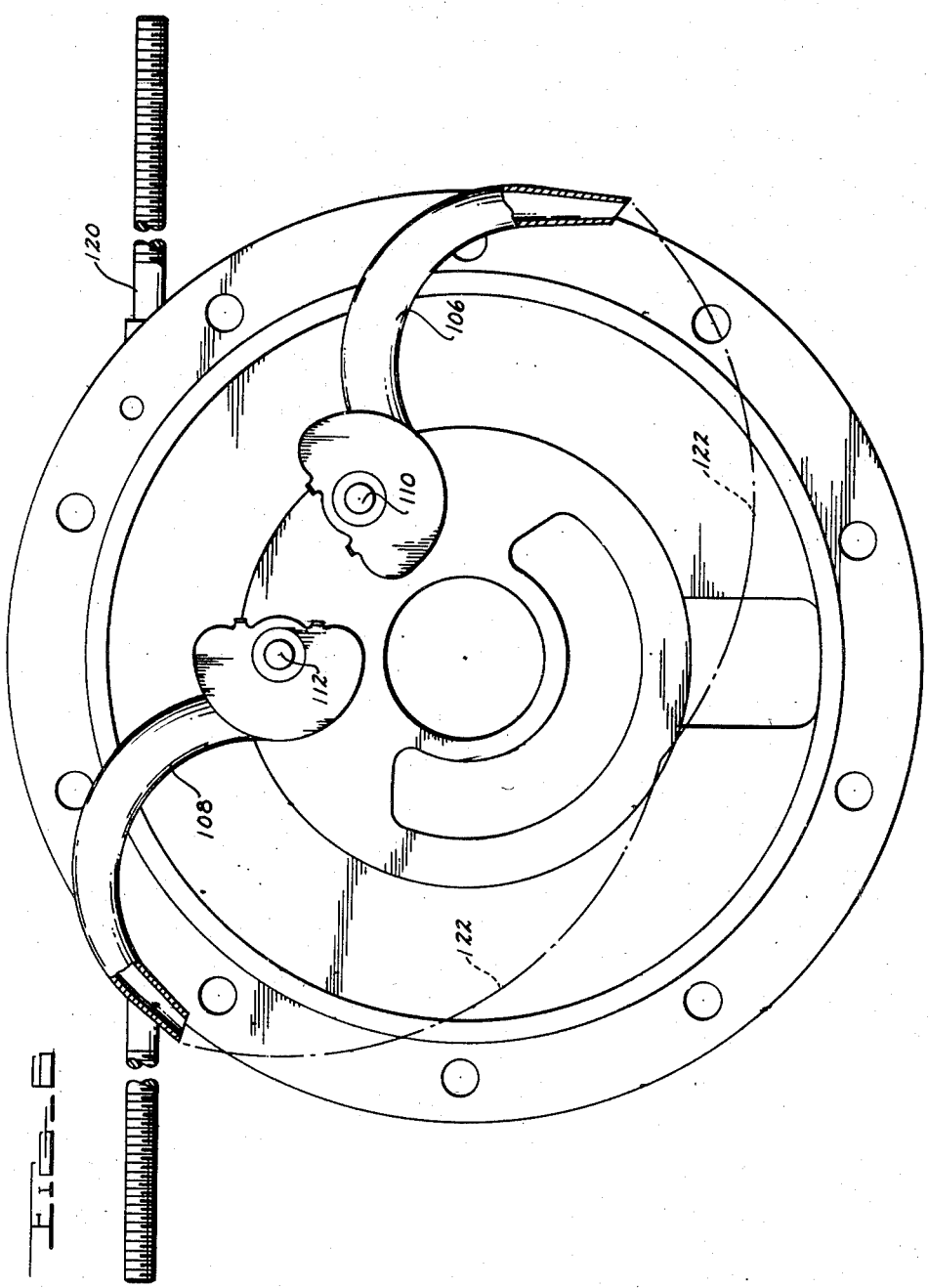
INVENTOR.
AXEL F. L. ANDERSON
BY
ATTORNEYS

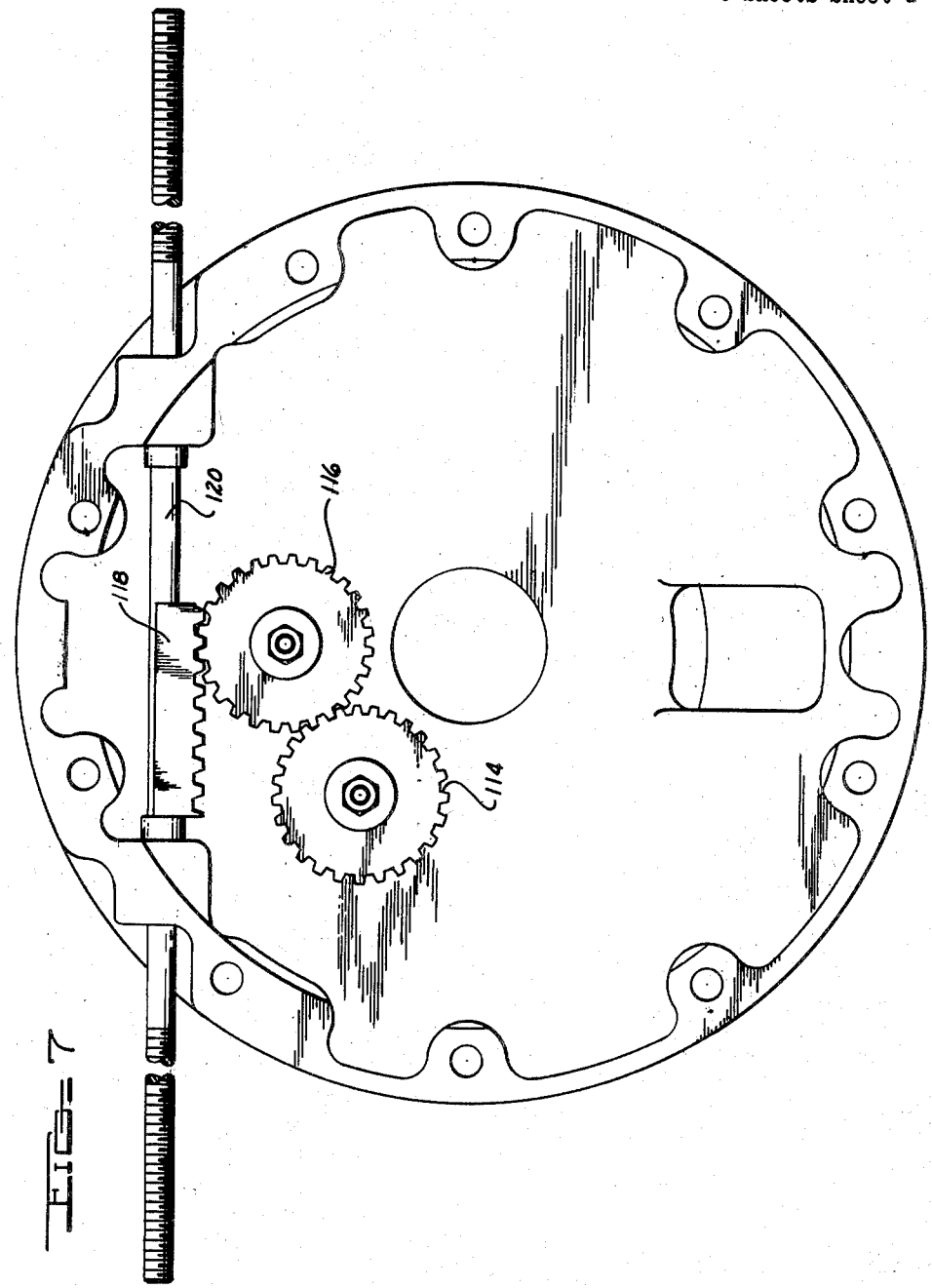

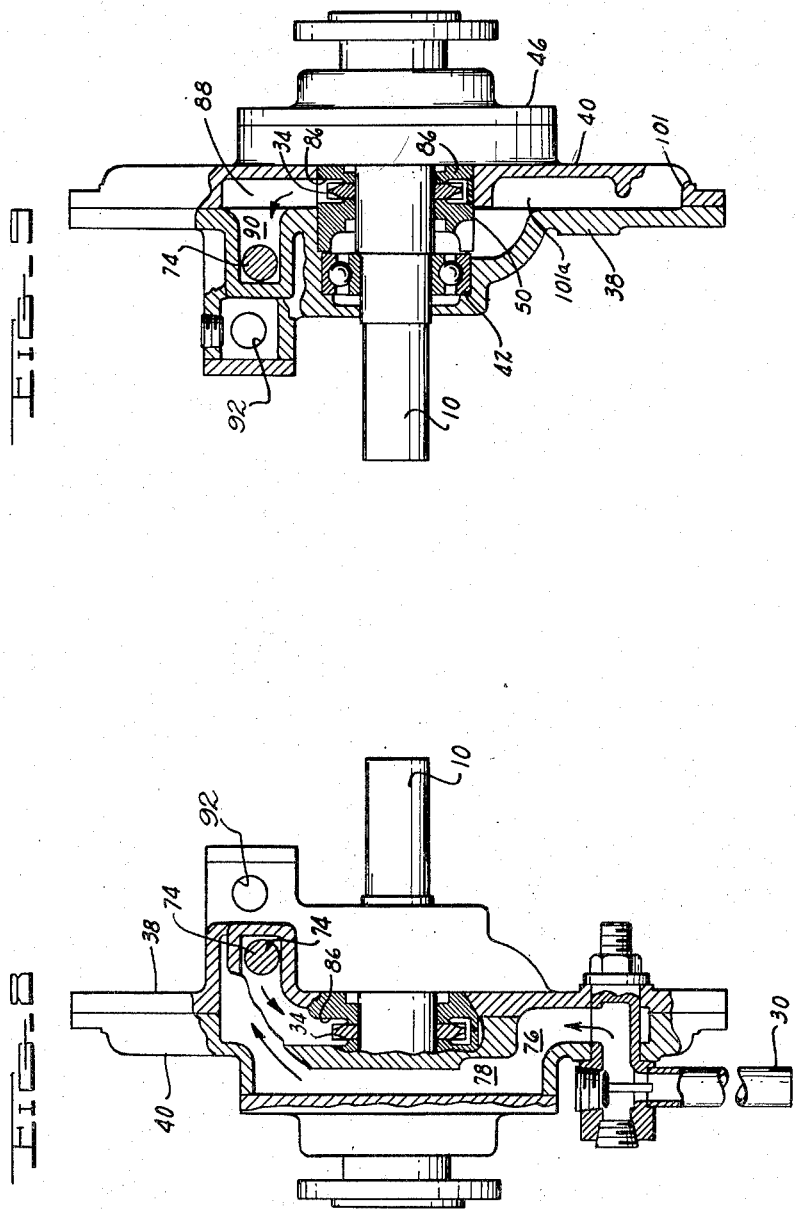

United States Patent Office 2,784,555
Patented Mar. 12, 1957

2,784,555

FLUID COUPLING

Axel F. L. Anderson, Detroit, Mich., assignor, by mesne assignments, to American Radiator & Standard Corporation, New York, N. Y., a corporation of Delaware Application December 10, 1953, Serial No. 397,415

6 Claims. (Cl. 60—54)

The present invention relates to rotary torque transmitters employing a working liquid, such for example as hydraulic couplings, and it is concerned with various improvements over the prior art which allow more universal application of units embodying the invention.

More particularly, this invention pertains to hydraulic couplings which have scoop means for varying the amount of fluid contained within the working members, that is, the impeller, runner and runner casing, for the purpose of varying the speed of the secondary or runner shaft or for varying the maximum torque that can be transmitted. Previously, hydraulic couplings have been made which can be rotated in either direction at will, but not of the type wherein a movable scoop tube, acting as a weir, regulates the quantity of hydraulic liquid in the working members and which includes all necessary parts and mechanisms in one enclosure for reversing the rotation. Other reversible couplings of this general character require auxiliary pumps and/or control mechanisms mounted externally and separately from the hydraulic coupling. This limits the use that can be made of such couplings and increases their cost when greater application is required.

It is the principal object of the present invention to overcome these defects and to provide a rotary torque transmitter which can be easily reversed without disassembling the same or substituting parts, so that it will have more universal application.

It is another object of the present invention to provide a rotary torque transmitter of the foregoing character which includes a liquid pump unit driven directly from the driving member of the transmitter so as to simplify its construction and to reduce the possibility of pump failure, and a valve means for reversing the direction of flow of the working liquid through the manifold when the direction of rotation of the driving member is reversed, thereby effecting the proper flow of working liquid to the hydraulic coupling or the like irrespective of the direction of rotation of the driving member.

It is still another object of the present invention to provide a rotary torque transmitter of the foregoing character which has scoop means disposed in a rotary chamber of the transmitter for the purpose of withdrawing working liquid from the chamber, said scoop means being constructed and arranged to operate with optimum effectiveness irrespective of the direction of rotation of the rotary chamber.

Other objects of this invention will appear in the following description and appended claims, reference being had to the accompanying drawings forming a part of this specification wherein like reference characters designate corresponding parts in the several views.

In the drawings:

Fig. 1 is a side elevation partially in section illustrating a rotary torque transmitter embodying one form of the present invention;

Fig. 2 is an exploded view of the working parts of the rotary torque transmitter;

Fig. 3 is an end elevation of the end bell when viewed the direction of the arrows on the lines 3—3 of Fig. 1;

Fig. 4 is an end elevation of the pump casing and pump impeller when viewed in the direction of the arrows on the lines 4—4 of Fig. 1;

Fig. 5 is a sectional view taken on the lines 5—5 of Fig. 3 and in addition showing the corresponding section of associated parts;

Fig. 6 shows the scoop elements of the rotary torque transmitter and is taken on the line 6—6 of Fig. 1;

Fig. 7 shows the means for adjusting the position of the scoop elements and is taken on the line 7—7 of Fig. 1;

Fig. 8 is a schematic section through the pump suction chamber with portions removed to show more clearly the path of liquid flow; and Fig. 9 is a similar schematic section through the pump discharge chamber.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a more detailed description of the illustrated embodiment of the invention will be given. The rotary hydraulic coupling includes a driving shaft 10 adapted to be connected to any suitable prime mover, and a driven shaft 12. An hydraulic coupling 14 operatively connects these shafts in the conventional manner. The impeller 16 is fastened to the inner end of driving shaft 10 and the runner 18 is fastened to the adjacent inner end of driven shaft 12. Outer casings 20 enclose the impeller 16 and runner 18 as well as the scoop means 22. Controls for operating the scoop means 22 are shown at 24.

The hydraulic coupling 14 and the scoop means 22 are positioned above the sump 26 which acts as a reservoir for the working liquid. A baffle 28 is positioned in the sump 26 for clearing the froth from the working liquid before it is returned to the hydraulic coupling 14 by way of the conduit 30, manifold 32 including valve means to be described later, pump impeller 34, a cooler (not shown), back through the manifold 32 and to the impeller 16 through the duct 36.

These various parts and their manner of assembly can best be seen in Fig. 1 and the exploded view in Fig. 2. Referring to the latter, the driving shaft 10 is shown having a flanged end portion by which it is secured against rotation to the one half of the outer casing 20 and to the impeller 16. An end bell 38 which includes the valve means to be described, and a pump casing 40 are fastened together to form the manifold and are journaled on the shaft 10 by means of the bearings 42 and 44. A cover plate 46 is disposed over the end of bearing 44, and bearing 42 is maintained in place by the cut out shoulder portion 48 in the end bell 38. Also carried by the driving shaft 10 is the pump impeller 34 which is keyed to the shaft to rotate therewith. It should be understood however, that other types of reversible pumps, such as gear pumps or the like, may be used without deviating from the present invention. Enclosing the pump periphery and mounted in the pump casing is the ported sleeve 50 which provides communication from the impeller 34 to desired passages in the manifold 32.

The driven shaft 12 has its inner end carried in the bearing 52 which is mounted in a cut out portion 54 in the impeller 16. A working liquid seal 56 prevents excessive leakage of the working liquid through bearing 52. The runner 18 is attached directly to the driven shaft 12 by means of the flange 58 and bolts 60. The other half of casing 20 fits over the runner 18 and is attached to the remainder of casing 20 by suitable means such as the nuts and bolts 60 shown in Fig. 1. Disposed between the joined ends of the outer casing 20 is a baffle 62 which divides casing 20 into two compartments, one to contain the working liquid in close intimacy with the runner 18, and a second compartment in which scoop tubes, to be described, operate to regulate the quantity of liquid in the first compartment. A plurality of passages near the periphery of baffle 62 provide liquid communication between said compartments.

Disposed near the outer end of driven shaft 12 is an end cover plate 64 in which is mounted the bearing 66. The cover plate 64 is fastened to the frame 68 of the torque transmitter by a plurality of bolts 70 which also aid in carrying the housing 72 in which is housed the controls for the scoop means 22.

As has been explained, the present embodiment of the invention has several novel features which allow it to be used selectively in conjunction with a prime mover whose drive shaft rotates in either direction. One of these features is embodied in the manifold and valve arrangement used in directly the working fluid from the sump back to the hydraulic coupling 14.

For a more detailed explanation of this feature, attention is directed to Figs. 1, 3, 4, 5, 8 and 9 of the drawings. When the rotary torque transmitter is in operation the working liquid is initially drawn from the sump 26 up through the conduit 30. Assuming the impeller 16 is to be rotated in a counter-clockwise direction, the piston valve 74 will be in the position shown in Fig. 5. The working liquid will then flow from conduit 30 through duct 76 into the chamber 78 in the pump casing 40. The liquid will continue through this chamber in the direction of the arrows and out duct 80 to the port 82 formed in the pump casing 40 and end bell 38. The liquid then flows in the direction of the arrows in Fig. 5 into the chamber 84 of the pump casing 40. Here the pump impeller 34 will impel the liquid around the impeller casing 86 in the direction of the arrows and out into chamber 88. Thereafter, the liquid will flow through the ports 90 and 92 in the valve chamber to the working liquid cooler (not shown).

The working liquid will return from the cooler (not shown) through inlet 94 and into chamber 96 from whence it passes out port 98 through duct 100 in shaft 10 to the duct 36 which allows the working liquid to pass into the hydraulic coupling 14. A drain is provided at 101 from which any leaking hydraulic liquid collected in passageway 101a can be returned to sump 26.

If it should now be desired to reverse the direction of rotation of the torque transmitter, nothing further need be done than to reverse the direction of rotation of driving shaft 10. This will have the effect of reversing the direction of rotation of pump impeller 34; and thus, the direction of flow of the working liquid within the impeller casing 86. The chamber 84 which previously was the pump suction chamber will now become the pump discharge chamber, and the chamber 88 which was the pump discharge chamber will now become the pump suction chamber. This reversal of flow of working liquid will act to automatically shift the piston valve 74 so that its right end 102, Fig. 5, abuts against the stop 104. Thus, when the pump impeller 34 is reversed, the working liquid will flow through the chamber 84 and into port 105 where it will impinge on the left end of piston valve 74 forcing it to move to the right until its right end contacts stop 104. By virtue of this novel arrangement, the same pump, manifold and piston valve can be used irrespective of the direction of rotation of the driving shaft 10, and the piston valve will act automatically to effect the proper flow through the manifold when the direction of rotation of the shaft is reversed.

The operation of the disclosed torque transmitter is controlled by scoop tubes in a manner well known in the art, but a novel arrangement is used to effect such control irrespective of the direction of rotation of the hydraulic coupling 14. Referring to Figs. 1, 6 and 7 an explanation of this novel feature will be given.

The scoop means 22 includes two oppositely disposed, reversely curved scoop tubes 106 and 108 which are mounted on the shafts 110 and 112. Also mounted on shafts 110 and 112 are the gears 114 and 116 which are in mesh so that equal and opposite rotation of the shafts 110 and 112 will be effected upon rotation of the gear 116. The latter is rotated by lateral movement of the rack 118 which occurs when shaft 120 is moved axially by conventional external means (not shown). Thus, the ends of the scoop tubes 106 and 108 can be moved to desired positions on the broken lines 122, Fig. 6, merely by moving shaft 120. In this manner the amount of working fluid to be removed from the rotating casing 20 can be regulated irrespective of the direction of rotation of the fluid coupling 14.

Since the ends of scoop tubes 106 and 108 are faced in opposite directions, one will be effective in removing working fluid from the casing 20 when the latter is rotated in one direction, and the other scoop tube will perform the same function when casing 20 is rotated in the opposite direction. Thus, when casing 20 is rotated in a clockwise direction, scoop tube 108 will be in an operative position while scoop tube 106 will be in an inoperative position. Reversing the rotation of casing 20 will reverse the functions of these scoops tubes. As can be seen in Fig. 1, scoop tubes 106 and 108 are axially displaced with respect to each other so that the working tip of the operative tube is clear of the furrow left in the surface of the working liquid by the back of the inoperative tube.

From the foregoing description it can be readily understood that the illustrated embodiment of the invention can be used for transmitting torque regardless of direction of rotation without the necessity of making external adjustments. The scoop tube controls are equally effective for both directions of rotation of the torque transmitter. The same is true with respect to the working liquid pump. Thus, a rotary torque transmitter is provided which has more universal application than was possible with prior art devices. Furthermore, since the pump impeller is driven directly from the drive shaft of the transmitter there is very little chance of a pump failure, thereby assuring the best operating results from the torque transmitter.

Having thus described my invention, I claim:

1. A hydraulic torque transmitter having a work chamber defined by impeller and runner elements with substantially radial vanes so that said elements can be rotated selectively in either direction, a scoop chamber in axial alignment and communicating with said work chamber and rotatable with said impeller element for holding a rotating ring of liquid, two scoops housed in said scoop chamber for engaging the ring of liquid and supported independently from said scoop chamber so as to remain stationary normally during operation of said torque transmitter and being movable for the purpose of varying the distance of the scoop lips from the periphery of said scoop chamber, said scoops being substantially the same dimensions but being oppositely disposed in said scoop chamber so that one or the other will have its lip extending opposite to the direction of rotation of said scoop chamber, means connecting said scoops for simultaneously adjusting their positions within the scoop chamber whereby substantially the same torque transmitting characteristics will be derived from a setting of said means irrespective of the direction of rotation of the torque transmitter.

2. A hydraulic torque transmitter comprising a work chamber defined by impeller and runner elements having substantially radial vanes so that said elements can be rotated selectively in either direction, a scoop chamber in axial alignment and in liquid communication with said work chamber and rotatable with said impeller element for holding a rotating ring of liquid, normally stationary means extending into said scoop chamber and supported independently thereof for regulating the quantity of liquid in said rotating ring and thereby the amount of working liquid in said work chamber irrespective of the direction of rotation of said scoop chamber, a drive shaft connected to said impeller element, a reversible pump operatively connected to said shaft to be rotated by the latter for supplying working liquid to said work chamber, said pump having separate ports which operate as suction and discharge ports when the pump is rotated in one direction and conversely as discharge and suction ports when rotated in the other direction, a manifold providing communication between said ports and said work chamber, and valve means in said manifold automatically operable upon reversal of the drive shaft for shifting its position to reverse the connections to the ports of the pump so that only the operating discharge port of said pump will be in open communication with said work chamber irrespective of the direction of rotation of said pump.

3. A hydraulic torque transmitter comprising a work chamber defined by impeller and runner elements having substantially radial vanes so that said elements can be rotated selectively in either direction, a scoop chamber in axial alignment and communicating with said work chamber and rotatable with said impeller element for holding a rotating ring of liquid, two scoops housed in said scoop chamber for engaging the ring of liquid and supported independently from said scoop chamber so as to remain stationary normally during operation of said torque transmitter and being movable for the purpose of varying the distance of the scoop lips from the periphery of said scoop chamber, the effective range of movement of said scoops being such as to control the dimension of said rotating ring of liquid and thereby the amount of liquid in said working chamber, said scoops being oppositely disposed in said chamber so that one or the other will have its lip extending opposite to the direction of rotation of said scoop chamber, a drive shaft connected to said impeller element, a reversible pump operatively connected to said shaft to be rotated by the latter for supplying working liquid to said work chamber, said pump having separate ports which operate as suction and discharge ports when the pump is rotated in one direction and conversely as discharge and suction ports when rotated in the other direction, a manifold providing communication between said ports and said work chamber, and valve means in said manifold automatically operable upon reversal of the drive shaft for shifting its position to reverse the connections to the ports of the pump so that only the operating discharge port of the pump will be in open communication with said work chamber irrespective of the direction of rotation of said pump.

4. A hydraulic torque transmitter comprising a work chamber defined by impeller and runner elements for transmitting torque when said impeller is rotated selectively in either direction, a scoop chamber in axial alignment and communicating with said work chamber and rotatable with said impeller element for holding a rotating ring of liquid, two scoops housed in said scoop chamber for engaging the ring of liquid and supported independently from said scoop chamber so as to remain stationary normally during operation of said torque transmitter and being movable for the purpose of varying the distance of the scoop lips from the periphery of said scoop chamber, the effective range of movement of said scoops being such as to control the dimensions of said rotating ring of liquid and thereby the amount of liquid in said working chamber, said scoops being oppositely disposed in said chamber so that one or the other will have its lip extending opposite to the direction of rotation of said scoop chamber, a drive shaft for turning the impeller element of said work chamber, a reversible pump operatively connected to said shaft to be rotated by the latter for supplying working liquid to said work chamber, said pump having separate ports which operate as suction and discharge ports when the pump is rotated in one direction and conversely as discharge and suction ports when rotated in the other direction, a manifold providing communication between said ports and said work chamber, and valve means automatically operable upon reversal of the drive shaft for shifting its position to reverse the connections to the ports of the pump so that only the operating discharge port of the pump will be in open communication with said work chamber irrespective of the direction of rotation of said pump.

5. A hydraulic torque transmitter comprising a work chamber defined by impeller and runner elements for transmitting torque when said impeller is rotated selectively in either direction, a scoop chamber in axial alignment and communicating with said work chamber and rotatable with said impeller element for holding a rotating ring of liquid, two scoops housed in said scoop chamber for engaging the ring of liquid and supported independently from said scoop chamber so as to remain stationary normally during operation of said torque transmitter and being movable for the purpose of varying the distance of the scoop lips from the periphery of said scoop chamber, the effective range of movement of said scoops being such as to control the dimensions of said rotating ring of liquid and thereby the amount of liquid in said working chamber, said scoops being oppositely disposed in said scoop chamber so that one or the other will have its lips extending opposite to the direction of rotation of said scoop chamber, a drive shaft for turning the impeller element of said work chamber, a pump with a rotor element mounted on said drive shaft to be driven thereby in either direction of rotation for supplying working liquid to said work chamber, said pump having two ports, one operable as a discharge port in one direction of shaft rotation and the other operable as a discharge port in the other direction of shaft rotation, and valve means automatically operable upon reversal of the drive shaft for shifting its position to reverse the connections to the ports of the pump so that only the operating discharge port of the pump will be in open communication with said work chamber irrespective of the direction of rotation of said pump.

6. A hydraulic torque transmitter comprising a work chamber defined by impeller and runner elements having substantially radial vanes so that said elements can be rotated selectively in either direction, a scoop chamber in axial alignment and communicating with said work chamber and rotatable with said impeller element for holding a rotating ring of liquid, two scoops housed in said scoop chamber for engaging the ring of liquid and supported independently from said scoop chamber so as to remain stationary normally during operation of said torque transmitter and being movable for the purpose of varying the distance of the scoop lips from the periphery of said scoop chamber, the effective range of movement of said scoops being such as to control the dimensions of said rotating ring of liquid and thereby the amount of liquid in said working chamber, said scoops being oppositely disposed in said scoop chamber so that one or the other will have its lips extending opposite to the direction of rotation of said scoop chamber, a drive shaft connected to said impeller element, a pump operatively connected to said shaft to be rotated by the latter for supplying working liquid to said work chamber, and means for directing the working liquid from said pump to said work chamber.

References Cited in the file of this patent

UNITED STATES PATENTS

| | | |
|---|---|---|
| 2,150,150 | Burrows et al. | Mar. 14, 1939 |
| 2,187,656 | Kiep et al. | Jan. 16, 1940 |
| 2,264,341 | Sinclair et al. | Dec. 2, 1941 |
| 2,334,770 | Jeffrey | Nov. 23, 1943 |